(12) United States Patent
Müller

(10) Patent No.: US 7,917,494 B2
(45) Date of Patent: Mar. 29, 2011

(54) SYSTEM AND METHOD FOR A LOG-BASED DATA STORAGE

(75) Inventor: Thomas Müller, Herzogenbuchsee (CH)

(73) Assignee: Adobe Software Trading Company Limited, Hamilton (BM)

( * ) Notice: Subject to any disclaimer, the term of this patent is extended or adjusted under 35 U.S.C. 154(b) by 434 days.

(21) Appl. No.: 12/172,971

(22) Filed: Jul. 14, 2008

(65) Prior Publication Data

US 2010/0010967 A1    Jan. 14, 2010

Related U.S. Application Data

(60) Provisional application No. 61/080,223, filed on Jul. 11, 2008.

(51) Int. Cl.
   G06F 7/544 (2006.01)
   G06F 7/08 (2006.01)
(52) U.S. Cl. ................................. 707/711; 707/752
(58) Field of Classification Search ............ 707/752, 707/711
   See application file for complete search history.

(56) References Cited

U.S. PATENT DOCUMENTS

| | | | |
|---|---|---|---|
| 6,353,834 B1 | 3/2002 | Wong et al. | |
| 2003/0204537 A1* | 10/2003 | Liang et al. | 707/203 |
| 2006/0101033 A1* | 5/2006 | Hu et al. | 707/100 |
| 2007/0179996 A1 | 8/2007 | Azami | |

OTHER PUBLICATIONS

European Search Report in EP Patent Application No. 09165166.1 dated May 5, 2010, in 9 pages.

Webpage printed out from <http://en.wikipedia.org/wiki/Log-structured_file_system> on Sep. 23, 2008.
Webpage printed out from <http://research.microsoft.com/research/pubs/view.aspx?msr_tr_id=MSR-TR-2008-25> on Sep. 23, 2008.
Webpage printed out from <http://labs.google.com/papers/bigtable.html> on Sep. 23, 2008.
Webpage printed out from <http://labs.google.com/papers/bigtable-osdi06.pdf> on Sep. 23, 2008.
Webpage printed out from <http://www.idi.ntnu.no/grupper/db/research/conference_paper/1999/85_NIK99_Vagabond.pdf> on Sep. 23, 2008.
Webpage printed out from <http://www.sis.uncc.edu/~yzheng/publications/files/sisw-oneway-p11.pdf> on Sep. 23, 2008.
Webpage printed out from <http://damienkatz.net/2005/04/couchdb_archite.html> on Sep. 23, 2008.

(Continued)

*Primary Examiner* — James Trujillo
*Assistant Examiner* — Soheila Davanlou

(57) ABSTRACT

Embodiments of the invention provide a high-performance content management system with a log-based data storage. To speed data operations, updates and deletes are appended to log-based data files. Seek operations are not needed as old data is not overwritten or removed at the time of write operations. Instead, the log-based data files are periodically optimized by processes that compact data entries and remove data files containing old data. In addition, an associated index with entries accessible in constant time is used to facilitate the process of locating data entries within the data files. Embodiments of the log-based data storage are implemented in a standard file format for ease of development and maintenance and can be compressed to further improve performance. In one embodiment, the log-based data storage corresponds to a node-based logical data tree that can be adapted to house a variety of data, including data from relational databases.

41 Claims, 12 Drawing Sheets

OTHER PUBLICATIONS

M. Rosenblum and J.K. Ousterhout, "The Design and Implementation of a Log-Structured File System", pp. 1-15, Operating Systems Review, New York, NY, vol. 25, No. 5 (1991).

R.T. Fielding, Ph.D., "JSR 170 Overview—Standardizing the Content Repository Interface", pp. 1-16, XP-002578817, Chief Scientist, Day Software, Mar. 13, 2005, URL: http://www.day.com/dam/day/whitepapers/JSR_170_White_Paper.pdf [retrieved on Apr. 19, 2010].

"Secure Hash Standard", Federal Information Processing Standards Publication (FIPS PUB 180-1), U.S. Dept. of Commerce, Technology Administration, National Institute of Standards and Technology, Washington, D.C., U.S., Issued Apr. 17, 1995.

* cited by examiner

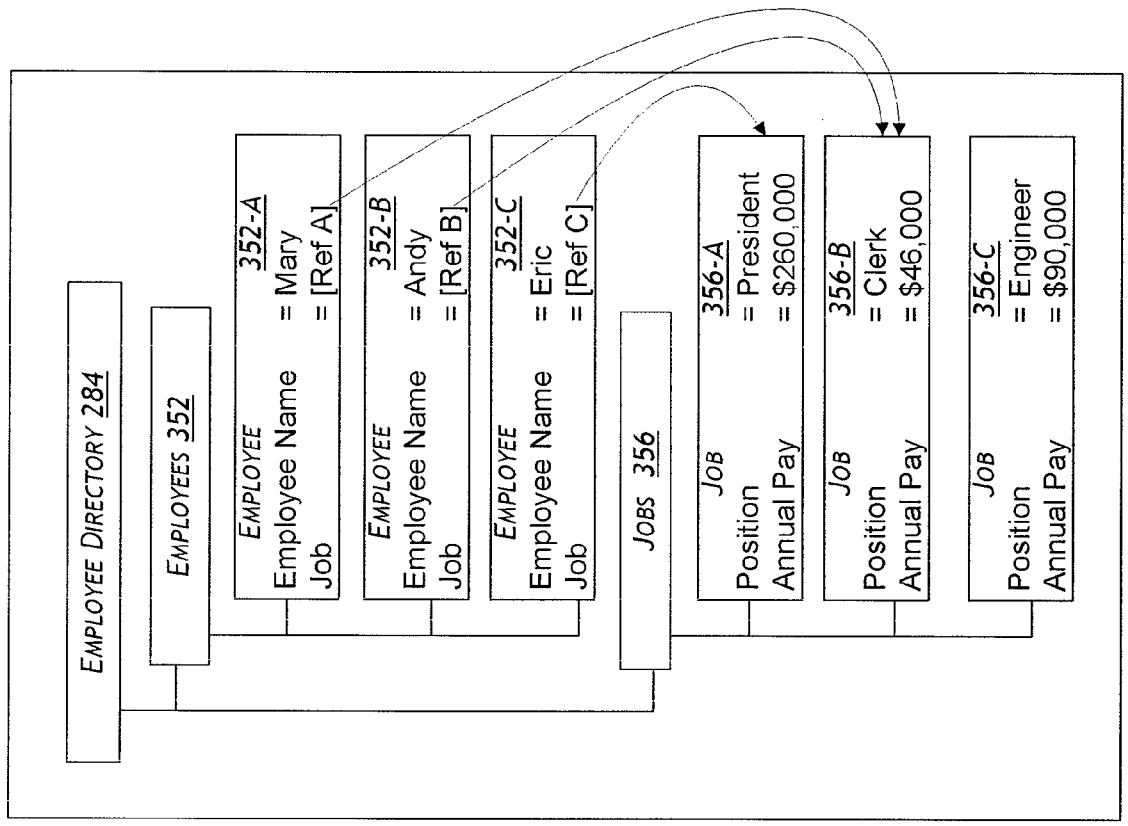
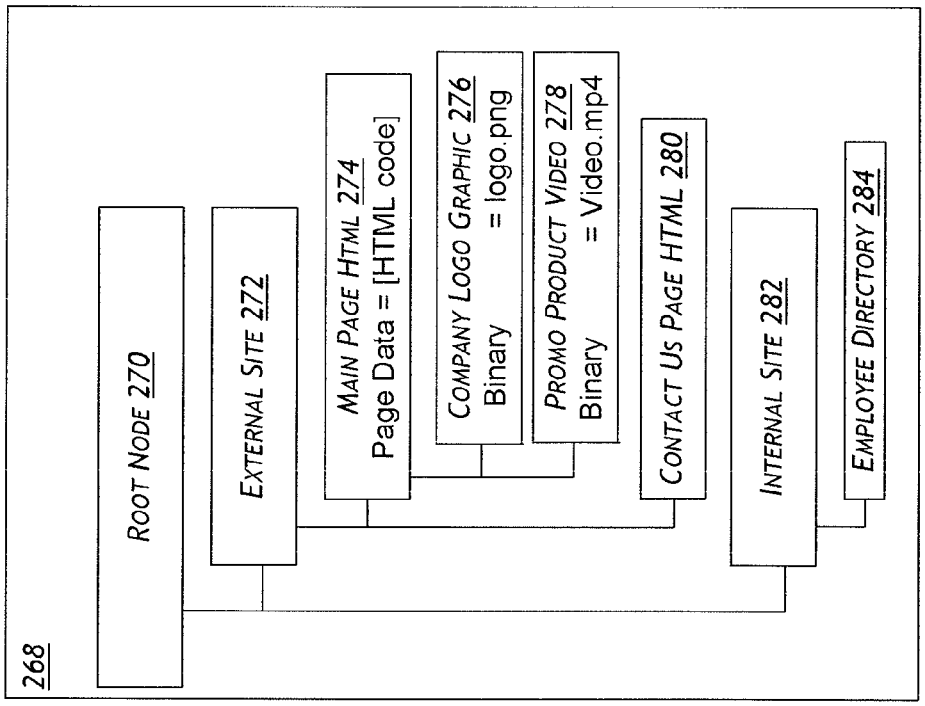
FIGURE 2B
CONTENT DATA - LOGICAL DATA STRUCTURE

FILE SET DATA STRUCTURE

DATA OPERATIONS

INDEX TO DATA RELATIONSHIP

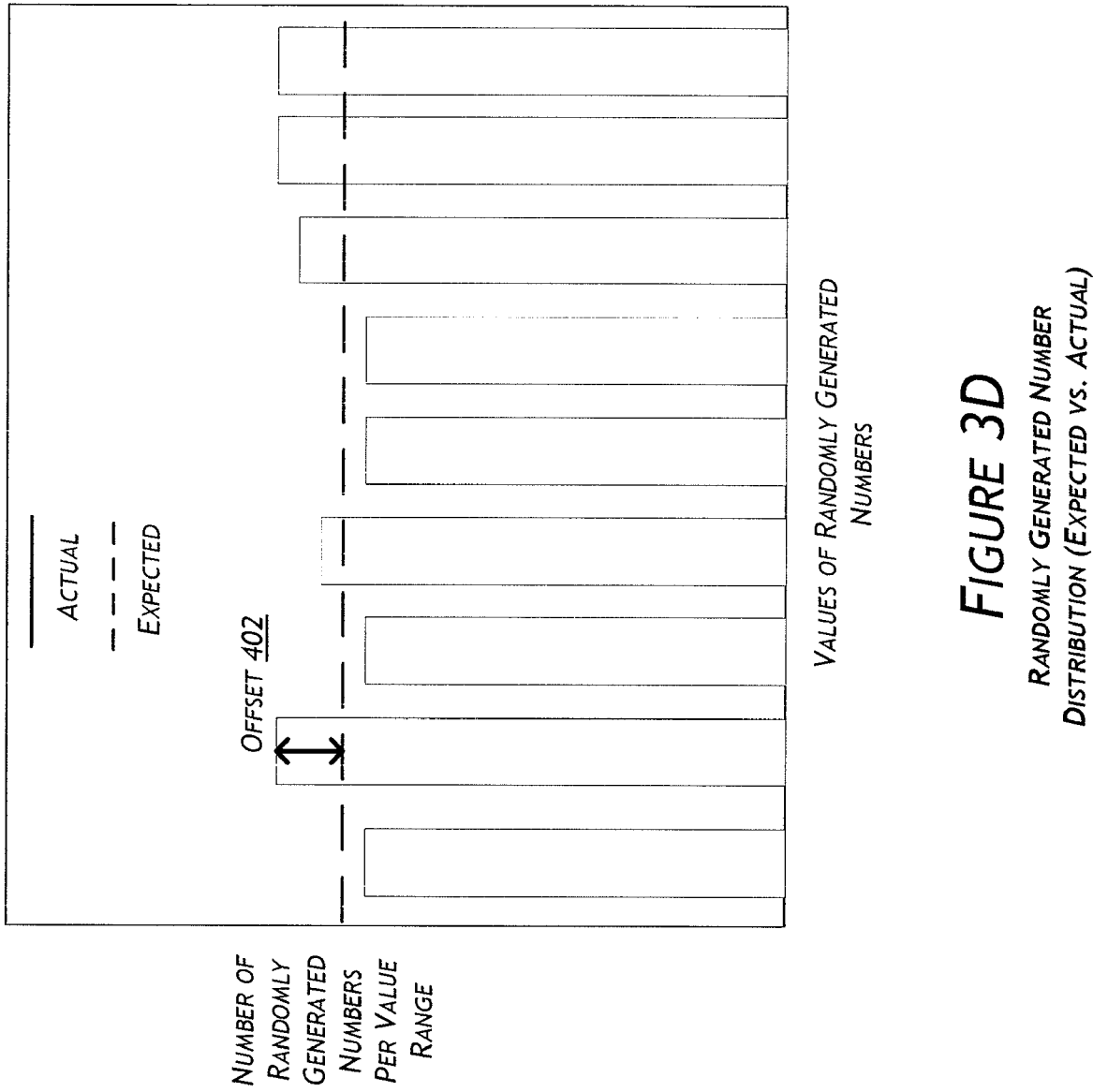

OFFSET CALCULATION

| Node ID Range | Number of Randomly Generated Node IDs Within Range | Offset (Difference between Actual and Expected Number of Node IDs in Range) |
|---|---|---|
| 1ST PERCENTILE: 0-99 | 49 | 49 - 56 = (-7) |
| 2ND PERCENTILE: 100-199 | 66 | 66 - 56 = 10 |
| 3RD PERCENTILE: 200-299 | 46 | 46 - 56 = (-10) |
| 4TH PERCENTILE: 300-399 | 57 | 57 - 56 = (-1) |
| 5TH PERCENTILE: 400-499 | 61 | 61 - 56 = 5 |
| 6TH PERCENTILE: 500-599 | 50 | 50 - 56 = (-6) |
| ⋮ | | |
| 99TH PERCENTILE: 9800-9899 | 58 | 58 - 56 = 2 |
| 100TH PERCENTILE 9900-9999 | 56 | 56 - 56 = 0 |

NUMBER OF NODE IDs GENERATED = 5,600

NUMBER OF NODE IDs EXPECTED PER PERCENTILE GROUP =
5,600 NODE IDs / 100 GROUPS = 56 EXPECTED NODE IDs PER GROUP

*FIGURE 3E*

LOCATING A TARGET INDEX ENTRY

PROCESS OF OPTIMIZATION

DATA FILES BEFORE OPTIMIZING:

DATA FILE 1

| ID | 1 | 1 | 2 | 1 | 2 | 3 |
|---|---|---|---|---|---|---|
| VALUE | A | B | C | - | D | A |

DATA FILE 2

| ID | 4 | 1 | 1 | 2 |
|---|---|---|---|---|
| VALUE | A | A | - | E |

DATA FILES DURING OPTIMIZING:

DATA FILE 1

| | 1 | 2 | 3 | 4 | 5 | 6 |
|---|---|---|---|---|---|---|
| ID | 1 | 1 | 2 | 1 | 2 | 3 |
| VALUE | A | B | C | - | D | A |

DATA FILE 2

| | 1 | 2 | 3 | 4 |
|---|---|---|---|---|
| ID | 4 | 1 | 1 | 2 |
| VALUE | A | A | - | E |

DATA FILE 3

| | 1 | 2 | 3 |
|---|---|---|---|
| ID | 2 | 3 | 4 |
| VALUE | E | A | A |

LATEST VERSION COPIED

DATA FILES AFTER OPTIMIZING:

DATA FILE 1

| ID | | | | | | |
|---|---|---|---|---|---|---|
| VALUE | | | | | | |

DATA FILE 2

| ID | | | | |
|---|---|---|---|---|
| VALUE | | | | |

DATA FILES WITH OUTDATED ENTRIES
- TO BE DELETED

DATA FILE 3

| ID | 2 | 3 | 4 |
|---|---|---|---|
| VALUE | E | A | A |

WORKING DATA FILE

FIGURE 5

SYSTEM AND METHOD FOR A LOG-BASED DATA STORAGE

CROSS-REFERENCE TO RELATED APPLICATIONS

This application is based upon and claims the benefit of priority from U.S. Provisional Patent Application No. 61/080,223 filed on Jul. 11, 2008, entitled "System and Method for a Log-Based Data Storage," the entire contents of which are hereby incorporated herein by reference in their entirety. All publications and patent applications mentioned in this specification are herein incorporated by reference in their entirety to the same extent as if each individual publication or patent application was specifically and individually indicated to be incorporated by reference.

BACKGROUND

This disclosure relates to a system and method for implementing a computer data structure, and in particular a content management system implemented in a log-based data storage.

Content management system (CMS) is a type of computer software that is frequently used for editing, storing, controlling, versioning, and publishing content such as web sites, news articles, operators' manuals, technical manuals, sales guides, and marketing brochures. Examples of common CMS software include Documentum by EMC Corporation, Alfresco by Alfresco Corporation, SharePoint by Microsoft Corporation, and FileNet by IBM. The type of files managed by CMS software may vary greatly, and may include text files, source codes, image media, audio files, and other electronic documents.

CMS's are usually implemented in relationship databases. A relational database is a common form of data storage that is usually implemented with data tables and associated indices. In addition, many relational databases keep track of data operations in transaction logs to allow for recovery and rollback in case of failures. However, these standard database components may suffer from poor performance due to their inherent inefficiencies. For example, the B-tree data structure that is commonly used as the lookup index is known to waste space (some implementations require up to 30% empty space). In addition, a search in a B-tree-based index can sometimes require logarithmic time. Moreover, write functions in these databases usually require many disk seek operations to overwrite existing data. As such, time consuming searches may need to be performed for both write and read operations. Finally, almost all relational databases use proprietary file formats, making tasks such as backup, integration and maintenance difficult and expensive.

SUMMARY

Systems and methods are disclosed that provide data structures and computer-executed processes for implementing a log-based data storage that may be used to implement a Content Management System (CMS). The log-based data storage is a high-performance persistent storage mechanism that offers marked improvements over existing systems in several ways. First, because the log-based data storage supports append-based write operations that are consistently performed at the end of the log files where data is stored, the write operations require no disk seeks and searching of the data structure before data is written. In addition, delete operations are handled in the same manner as updates by appending an indicator such as an entry of zero data length, and such as also do not require disk seek operations. Second, for read operations, the log-based data storage in some embodiments includes an index that enables searches to be accomplished in O(1) (constant) time, as compared to conventional databases that often require searches that take O(log n) (logarithmic) time. In one embodiment, data entries are referenced by randomly generated identifiers with a relatively even distribution and the associated index entries for the data entries are sorted by the randomly generated identifiers. Therefore, an index referencing a data entry by an identifier can be located directly with an instruction to read a calculated location. The calculated position takes into account a calculated offset that represents the difference between the actual and the expected distribution of the identifiers. Third, append-based operations enable time-intensive data operations to be executed separately as background processes that can be scheduled when volume of data operations is low.

In contrast to CMS's implemented in relationship database software that require expensive ownership and maintenance costs, in some embodiments, the log-based data storage is implemented in data structures that leverage existing file storage standards (e.g. UNIX's tar format). As such, the data can be easily viewed, extracted, and manipulated via known tools. This helps speed the development and maintenance of the log-based data storage. Also, the data format used is platform-independent and not tied to any specific database vendor format. The files of the log-based storage may also be compressed using a data compression format (e.g., gzip and zip) that supports blockwise compression, so that each entry (or a number of entries) is compressed individually.

Some embodiments provide a highly flexible logical data tree structure that is implemented on top of the log-based data storage. The tree is node-based, and can be adapted to store data content for a CMS, as well as any transactional data, e.g., data of a relational database.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 2B is a block diagram showing example applications of the logical data tree structure according to various embodiments;

FIG. 3D is a graph showing the difference between the expected and actual distributions of randomly generated numbers as used in various embodiments;

FIG. 3E is a chart illustrating an example offset calculation in accordance with one embodiment;

FIG. 5 is a diagram illustrating an example data optimization process according to one embodiment.

DETAILED DESCRIPTION OF THE PREFERRED EMBODIMENTS

A log-based data storage will now be described with reference to the drawings. Where possible, the same reference numbers are used throughout the drawings to refer to the same or like components. This description is intended to illustrate certain preferred embodiments, but other embodiments that are apparent to those of ordinary skill in the art, including embodiments which do not provide all of the benefits and features set forth herein, are also within the scope of this invention. As one example, some embodiments may omit some or all of the features described herein. Thus, nothing in this detailed description is intended to suggest that any particular feature or component is essential. The invention is defined by the claims.

Content Management System

Figure 1A:
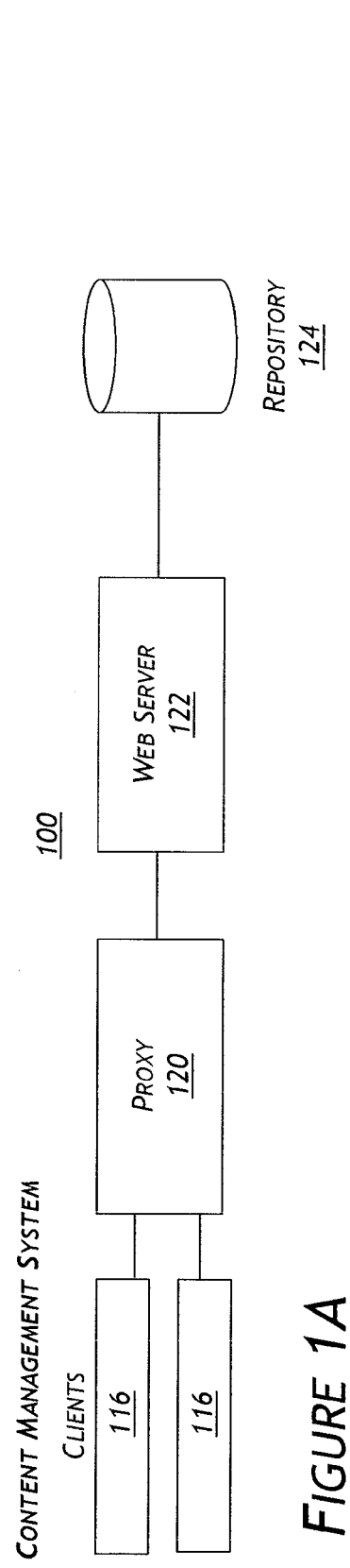
FIG. 1A is a block diagram of an illustrative content management system according to one embodiment.
Figure 1B:
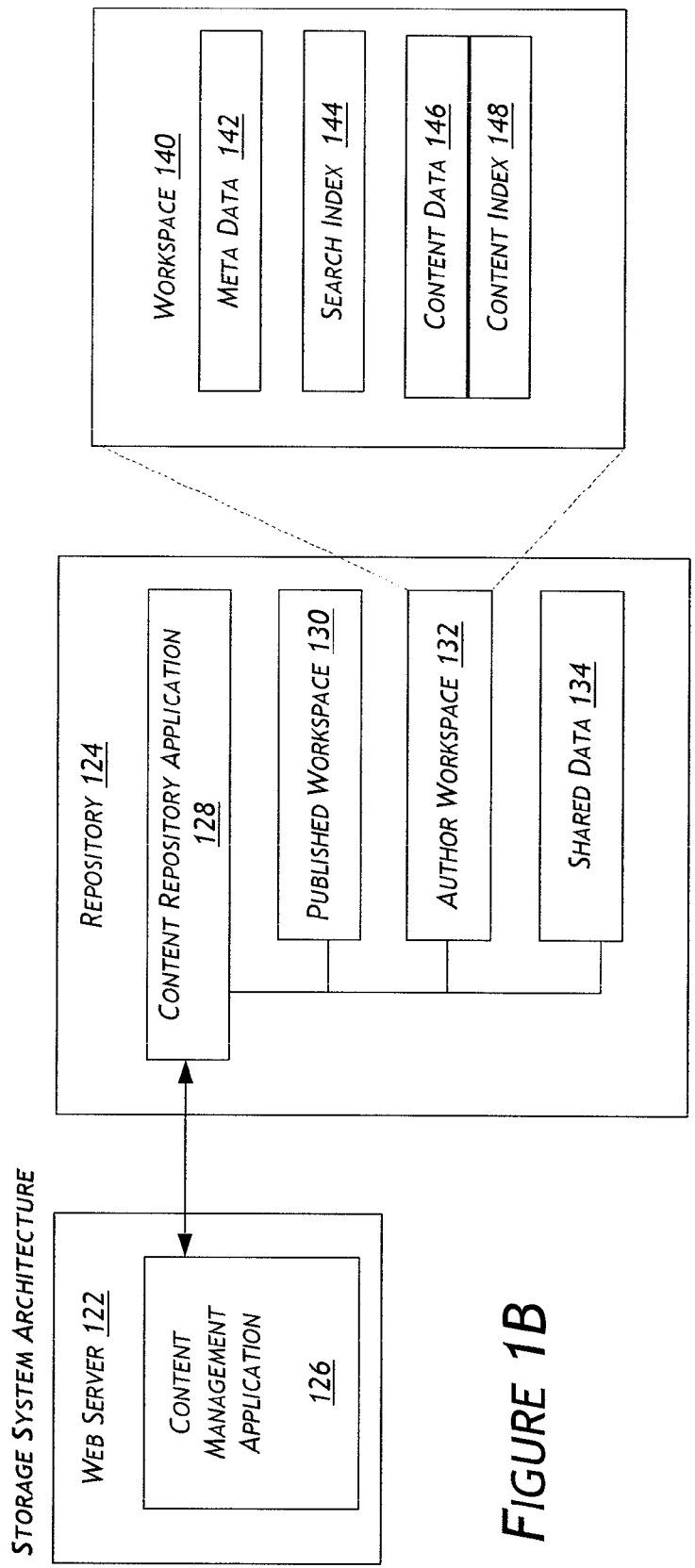
FIG. 1B is a block diagram of an illustrative storage system architecture according to one embodiment.

FIGS. 1A and 1B depict a context in which the log-based data storage may be used in accordance with one embodiment of the invention. FIG. 1A shows a content management system (CMS) 100 that includes a plurality of clients 116, an optional proxy 120, a web server 122, and a repository 124. The clients 116 access the web server 122 in order to access content stored on the repository 124. The access may be conducted via the proxy 120.

FIG. 1B shows in more details the various components of the web server 122 and the repository 124. A content management application 126 is configured to run on the web server 122. The content management application 126 is configured to receive requests from clients 116. Such requests may include requests to read, write, manage, or manipulate data stored in the repository 124.

A content repository application 128 is executed on the repository 124, and it is in communication with the content management application 126 to facilitate data access on the repository 124. The content repository application 128 manages one or more workspaces and one or more shared data areas. In one embodiment, the content repository application 128 stores its data in a publish workspace 130, an author workspace 132, and shared data area 134. The shared data area 134 can be configured to store a variety of data, including, for example, large files that are referenced by data entities in the author workspace 132, the publish workspace 130 and/or any other workspace in the repository 124.

Workspaces are used to partition data. In one embodiment, workspaces are used to store different versions or states of what is logically the same content. For example, the content in the author workspace 132 is edited by content authors, and after reviewing the changes made by the authors in this workspace, portions of the changes are copied to the publish workspace 132. In an embodiment where the workspaces are used to store interne content, the author workspace 132 may be used as the working area, while the publish workspace 130 may contain data intended to be published to the public. In another embodiment, one workspace may contain an older version of a product while another workspace may contain a newer version of a product. Although two workspaces are shown, any number of workspaces can be used to accommodate various applications.

Although the author workspace 132 has been enlarged in FIG. 1B to provide further details of a workspace, workspace 140 is intended to be an example generic workspace that can be used in any part of the repository 124, e.g., as the published workspace 130 or any other workspace. The workspace 140 includes meta data 142, a search index 144, and a content portion including a content data storage 146 and a content index 148. These components will be further described in detail below.

Logical Data Structure of the Log-based Data Storage

Figure 2A:
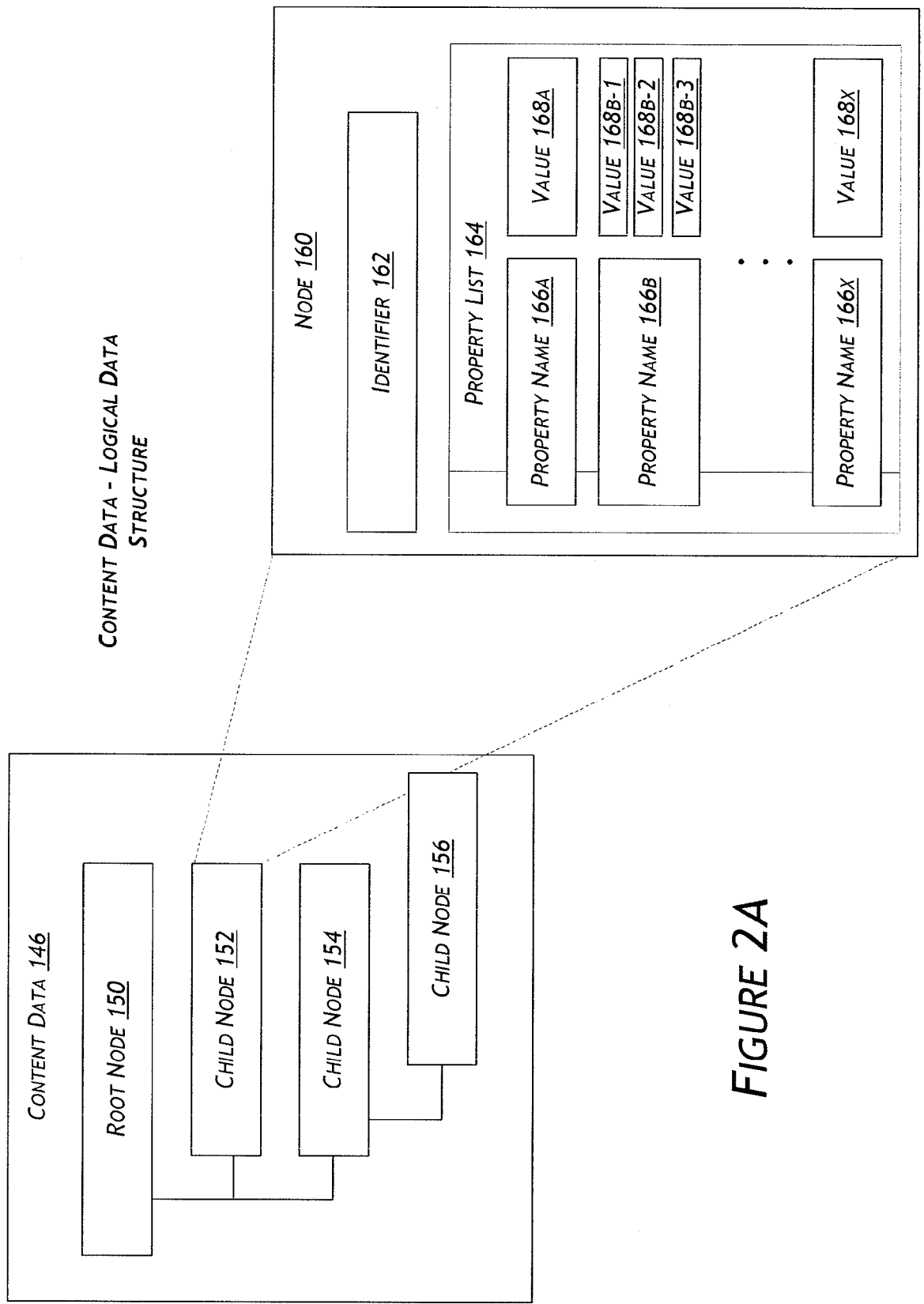
FIG. 2A is a block diagram of a logical data tree structure according to one embodiment.

FIGS. 2A and 2B show the logical data structure of the log-based data storage in accordance with one embodiment. In some embodiments, the content data storage 146 is implemented in a logical data tree structure with at least one root node 150 and one or more child nodes (152, 154, or 156). Each child node can have one or more child nodes. For example, as shown in FIG. 2A, child node 154 has a child node 156.

As shown by the generic node 160, a node may include a unique identifier 162 and a list of properties 164. The unique identifier 162 is a randomly generated universally unique identifier (UUID) in one embodiment. The UUID, also described as a node ID in the latter part of the specification, is generated in one embodiment by the SHA-1 (Secured Hash Algorithm) random number generation process. The list of properties 164 may include one or more property name-value pairs for storing data for the node. Each pair may have a property name 166 and a value 168. A property typically has one value, but in some cases it can have a list of values. For example, property name 166B has a list of three values 168B-1, 168B-2, and 168B-3. Data relating to how the node fits into the tree structure, e.g. references to parent/child nodes, list of child nodes, may also be stored in the list of properties 164.

Example Application—Storing Data Content in a Hierarchical Directory Structure

The node based logical data tree structure can accommodate a variety of data applications. FIG. 2B demonstrates the versatility of the logical data tree structure. Because of its hierarchical nature, the data tree is well suited to store content with a hierarchical structure. For example, web site content is often stored in a directory structure, with media assets such as graphic and video files stored along with web page files stored in a hierarchical structure. As shown in FIG. 2B, example content data storage 268 stores a company's external and internal web sites. Node 272 is a directory node that denotes the directory for the company's external site. Stored within the external site directory are web pages and other related data files for the company's external site. For example, node 274, which is a child node of node 272, stores the HTML code for the main page of the external site. The actual HTML code may be stored as a property name-value pair as shown in FIG. 2B. Alternatively, a property name-value pair within node 272 may reference an external location at which the HTML code may be stored. In addition, because a node may have a list of properties with multiple property name-value pairs, some pairs may be used to store actual code while others may reference HTML codes obtained from external sources. This arrangement may be useful in situations where portions of the HTML codes may be dynamically generated by other applications.

Continuing with the data tree structure in content data storage 268, nodes 276 and 278, which are child nodes of node 274, are used to store media assets that are associated with the main page. As shown, node 276 is configured to store a reference to a graphic file containing the company logo. The property name-value pair in node 276 indicates the name of the graphic file. In addition, another property name-value pair (not shown) may indicate the location of the file. In one embodiment, files such as graphic files, video files, audio files, or any other larger files may be stored in the shared data area 134 previously shown in FIG. 1A. Similarly, node 278 is configured to store a reference to a product video file associated with the main page. While nodes 276 and 278 are references in the example shown in FIG. 2B, in some embodiments the nodes themselves may contain the actual file data.

Finally, directory node 282 denotes a directory for files related to the company's internal site. Because directory node 282 is set apart from directory node 272 (the external site), an administrator may, for example, be able to create access restrictions as property name-value pairs within directory node 282 to restrict access to the child nodes under node 282. Although a web site example has been described, those skilled in art will recognize that the node-based data tree structure can be adapted to store any type of file and directory system. For example, the node-based data tree can be configured to store a version-controlled software repository, as well as a version-controlled document management system.

Example Application—Storing Relational Database Data

The other example shown in FIG. 2B depicts how a relational database data structure can be implemented in the node-based data tree structure in various embodiments. Node 284 denotes an employee directory database. Within the example employee database are two database "tables," an employees "table," denoted by node 352, and a jobs "table," denoted by node 356. As shown, three employee entries are within the employees "table," and the three entries are denoted by nodes 352-A, 352-B, and 352-C. For example, the data stored in node 352-A is equivalent to a record or a row within a relational database table. However, instead of a row with various column values, in various embodiments of the invention data is stored in property name-value pairs. In this example, whereas a relationship database table may have two columns, "Employee Name" and "Job," they are implemented as property names in the nodes.

In addition, a value may be a reference to another node, and by these references the various tables in the data tree may be joined. In the example shown, each employee node (352-A, 352-B, and 352-C) contains a reference to the "Jobs" "table." As shown, the value of Mary's "Job" property is a reference to node 356-A. The references keep the process of updating straightforward. For example, should Mary receive a promotion to the job of "Engineer," the reference in her "Job" property can simply be updated to point to node 356-C.

Mixture of Data Applications

Besides being adaptable for various data applications, the flexibility of the node-based data tree offers a dynamic and powerful system for storing and managing a wide variety of data in a single application. As shown in FIG. 2B, the employee directory 284, a relational database application, can be placed in the same data tree as the one storing the company's external and internal sites. Practically speaking, this allows data from one or more relational databases to be stored along with web pages, video files, or other files in a single logical as well as physical data structure. The storage of a variety of data applications in a uniform environment greatly reduces maintenance and development costs, as tools such as adaptors, connectors, and drivers that are needed to integrate disparate systems are not needed.

Data Storage: Data File

Figure 3A:
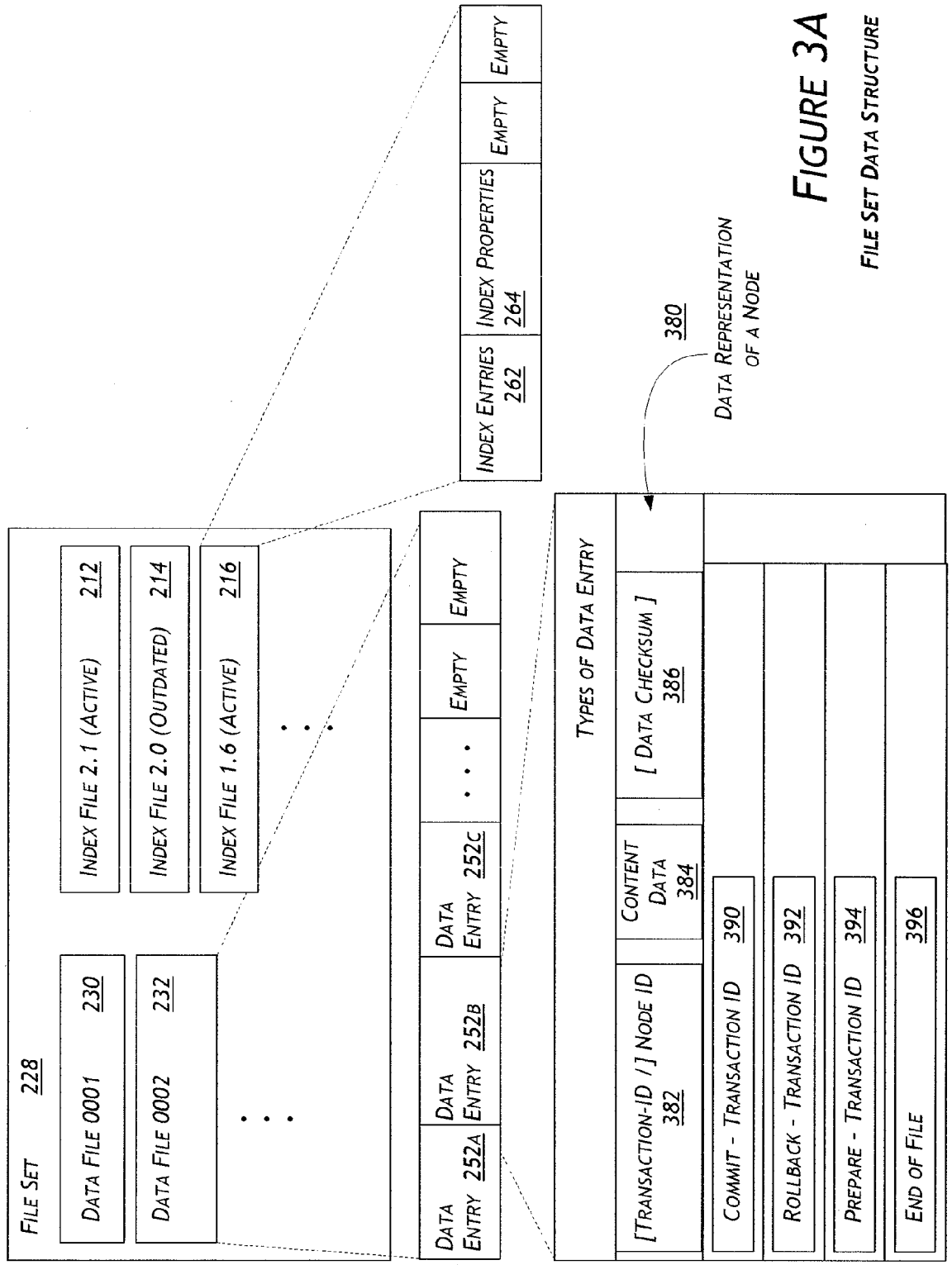
FIG. 3A is a block diagram depicting an illustrative file set data structure according to one embodiment.

FIG. 3A shows a primary data architecture for storing the node-based data tree depicted in FIG. 2A. In various embodiments, the nodes of the data tree are stored as data entries (e.g., 252) in one or more log-based data files within a file set. As shown, a file set 228 includes a number of files, which are optionally stored together in a directory in some embodiments. There are two types of files: data files that contain content data (e.g., 230 and 232), and index files that enable the system, e.g., the content repository application 128, to locate data quickly (e.g., 212, 214, and 216). In contrast to CMS's that are implemented in proprietary database software, in some embodiments these content data and index files may be stored as part of a file system of a standard operating system or as part of a custom-made application. The files may be stored in one or more magnetic disks such as hard drives, as well as in non-volatile memory such as flash drives. Some or all of the files may be stored in memory.

In one embodiment, because updated data is appended to the data file rather written over old data, multiple older versions of the same data may exist in the data files and the index files help speed up the process of locating the most updated version of content data. Data change operations will be described in further detail in conjunction with FIG. 3B. Also, multiple data files may be in use, but in general new data reflecting additions, updates, and deletes to data are appended to the newest data file. In one embodiment, if a data file grows larger than a certain configurable size threshold, a new data file is created. In another embodiment, data files that do not contain active data are periodically deleted. A data file may grow obsolete when all its data has been indicated as updated or deleted by new data entries in a more recent data file.

As shown in FIG. 3A, the data files may contain numerous types of data entries. In embodiments where the data files are stored in a file system that requires file headers, the data files may include entries for storing file headers. In other embodiments where the underlying file system may require certain end of file markers, the data files may include entries for such markers. For example, the tar file format requires two empty blocks of 512 bytes each at the end of a file.

In addition to these file system-mandated entries, each data entry can be a:

data entry representing a node (380)—a data entry may or may not have a transaction identifier and may or may not have content data:

Entries without transaction identifiers are considered active, in the sense of taking effect immediately (or in database terms, these entries are "auto-committed"). No additional "commit" entry is required for such entries.

Entries with transaction identifiers are considered active (take effect) only if there is a commit entry for this transaction (see below for "commit entry").

Entries with data are the most common type of entries. These entries have key-value pairs (e.g., a node ID 382 and associated content data 384). There may also be a checksum 386 for the content data 384. The checksum is used for recovery purposes. In one embodiment, the log-based data storage can be distributed across multiple computer systems, and each unique identifier (node ID 382) may include one or more indicator bits to denote the specific computer system to which the entry belong.

Entries without data do not have a checksum and in one embodiment are used to reflect deleted data.

commit entry for a particular transaction ID (390)—this type of entry reflects the end of a transaction and indicates that changes associated with this transaction ID are active. For example, if a data entry of type 380 has includes a transactional ID of "0099" and a data entry of type 390 also has the transaction ID of "0099," that data entry of type 380 is considered committed.

rollback entry for a particular transaction ID (392)—this type of entry reflects the end of a transaction and indicates that changes associated with this transaction ID should be ignored.

prepare entry for a particular transaction ID (394)—this type of entry is used as a notification for two-phase commit transactions that are in the first "prepare" phase but have not yet entered the second "commit" or "rollback" phase. Once this transaction is committed or rolled back, it may be replaced by a commit or rollback entry; or the commit or rollback entry for this transaction may appear at a later time.

In one embodiment, the data file is implemented in a UNIX tar format. In another embodiment, it is implemented in a gzip format. Those skilled in the art will appreciate that other standard formats may be used. In addition, non-standard formats may also be used in order to optimize performance. For example, the tar format has a minimum read size of 1 k, which may not be suitable for all applications. A custom format may be created to accommodate a different minimum read size to increase performance.

Append-Based Data Operations

Figure 3B:
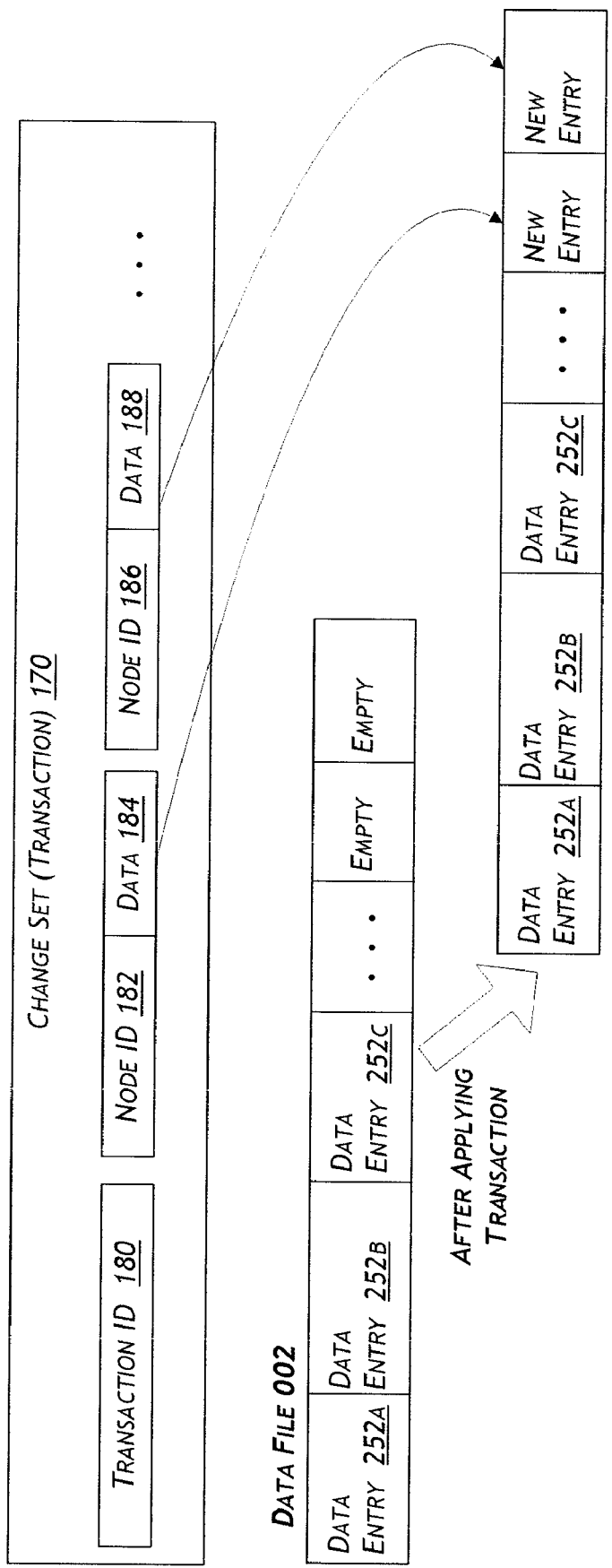
FIG. 3B is a block diagram depicting example data operations according to one embodiment.

FIG. 3B shows how data can be updated in accordance with one embodiment. Data operations are node-based, so that read and write operations are targeted to individual nodes. As mentioned above, each node is represented by a data entry in the data file. Data operations are typically accomplished in the form of a "change set," which is also known as a transaction. FIG. 3B shows an example transaction 170. As shown, the transaction 170 includes a unique transaction ID 180, and a list of one or more nodes to be changed. Each entry on the list includes a node ID (e.g., 182, 186) and new data for each node (e.g., 184, 188). In one embodiment, the unique transaction ID 180 is the time of the transaction in milliseconds (where the transaction ID is incremented if the previous transaction occurred within the same millisecond to ensure that the transaction ID unique), though those skilled in the art will recognize that various other types of randomly and/or consecutively generated identifiers may be used.

Data write operations are accomplished in an append-based fashion. As shown in FIG. 3B, the nodes on the list in the transaction 170 are written to the end of the data file "002." After the transaction is completed, i.e., the changes are deemed committed, data 184 and data 188 are written into previously empty slots at the end of the data file "002." This basic data write operation is used both for revising and deleting data. For revision, the data entry representing of the node that is the target of the revision is not revised. Rather, the updated information is written as a new data entry as described above, and an associated index, if implemented, is revised to point to the newly added data entry. As there may be any number of data files, and the changes are preferably appended to the latest data file. Node deletion is accomplished in much of the same way as revision, i.e., by storing a new data entry containing data indicative of a deletion (e.g., a data length of 0 or null value), and updating the index for the node to be deleted to point to the newly written data entry. In one embodiment all write operations including deletions are appended to the end of the data files only.

In contrast to common methods of updating data structures, the append-based data revision and deletion operations offer marked improvement in efficiency in several ways. First, because append-based write operations are consistently performed at the same logical location, e.g., at the end of the data file, the write operations require no disk seek operation before data is written. In some instances, the performance gain from the elimination of this seek time can be significant. Second, in embodiments where an associated index is implemented, the log-based structure requires searches that can be accomplished in O(1) (constant) time, while binary-tree based indices for conventional databases often require O(log n) (logarithmic) time searches. Third, the data files can be backed up at any time, including at runtime when write operations are on-going. The only restriction is that the files need to be copied in the order of creation, and that the files must not be deleted as part of the optimization process while the backup process is running.

Content Index

Figure 3C:
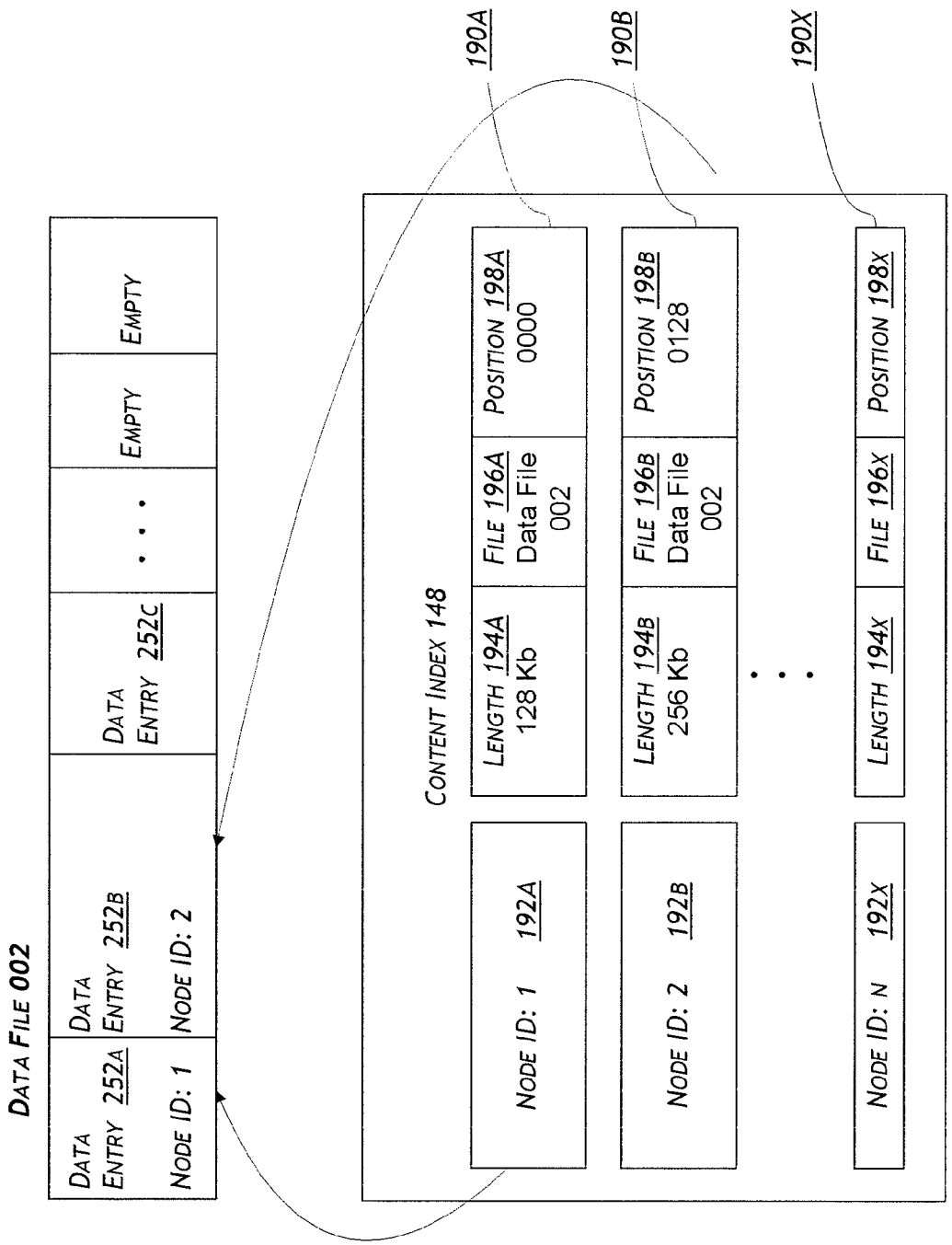
FIG. 3C is a block diagram illustrating the relationship between the index and the data files according to one embodiment.

Although it is not required, a content index may be used to speed up the process of locating, within the data files, the most updated data entry for a particular node. An example content index 148 is shown in FIG. 3C. The content index 148 may include a list of entries that reference data entries within the data files. In one embodiment, the index entries are of the same format and same size, for example, 64 byte. Each entry 190 may include a node ID 192, a number of reference information items including a data length entry 194, a data file reference entry 196, and a position entry 198. In one embodiment, a data length of 0 indicates that the data in the corresponding node has been deleted. Those skilled in the art will appreciate that other indicators or identifiers may be used to denote a deleted node. The position entry 198 indicates the absolute position of the data entry location within the file referenced in the data file reference entry 196. For example, given these reference information items, the data storage system, e.g., the content repository application 128, can locate the data entry 252A referenced by the index entry 190A as follows. First, the data storage system uses the data file reference entry 196A to identify the particular data file in which to locate the referenced data entry. In this case, the data file reference entry 196A indicates that the system should look in the "data file 002." Then, the data storage system can use position entry 198A to determine where in the "data file 0002" to look for the referenced data entry. As shown, since the data entry 252A is the first entry, the position is "0000." Then the length entry 194A can be used to instruct the underlying operating system to read 128 Kb of data to access this data entry 252A.

Multiple Index Files; Locating an Index Entry

If a content index is implemented, one or more index files may be used. In one embodiment, each index file has a major and a minor version number. Returning to FIG. 3A, among the three example index files shown, index file 212 has a major version number of 2 and a minor version of 1, as denoted by the marking "2.1." Index 214 is marked as version 2.0 and index 216 is marked as version 1.6. For each major version number, only the one with the highest minor version number is considered active (in effect). Thus, the index file 212 (version 2.1) is considered active while the index file 214 (version 2.0) is considered outdated. The index file 216 (version 1.6) is also considered active, as it is the highest numbered minor version of the major version 1.

During a data entry lookup, only active index files are searched. The process proceeds as follows. First, a lookup is made in the index file with the highest major version number. If the target data entry is found to be referenced in that index file, it is returned. Returning to the example, a lookup process would begin with the index file 212 since it has the highest version number (version 2.1) among active index files. If the index file 212 does not contain an index entry that references the target data entry, a lookup attempt is next made in the next lower major version index file. In the example, the next index file that is searched in the lookup process would be the index file 216 (version 1.6). This process repeats either until an index entry that references the target entry is located, or until there is no index file with a lower major version number.

In one embodiment, an index file includes a list of index entries 262 and a list of index properties 264. An example list of index entries has been described above in conjunction with the example index 194 in FIG. 3C. In one embodiment, the index entries are sorted in an ascending order by the node IDs. The index properties 264 may include:

the number of index entries in the index file,
the range of data entries referenced by this index file, which in one embodiment is indicated by the first and last data file ID and position referenced,
a checksum, and
a list of offsets for the node IDs in this index file.

Calculating the Location of an Index Entry

The offset is desirable for improving search efficiency of the index entries since the entries are sorted by node IDs. As described above, node IDs are generated using a commonly known secure pseudo random number generator such as SHA-1. Many other commonly known random number generation processes may be used, as they process the property of generating numbers with a relatively even distribution. Although the randomly generated numbers are expected to be evenly distributed, statistical analysis has shown that this is not always the case. FIG. 3D illustrates the difference between the expected and actual distributions of randomly generated numbers. As shown, the amount of randomly generated numbers may be above the expected amount for certain numerical value ranges and below the expected amount for other numerical value ranges. An offset 402 is the difference between the expected amount and the actual amount. An offset may be calculated for each group of value ranges to determine the difference between the actual and the expected number of node IDs generated within the value range.

FIG. 3E illustrates an example offset calculation for node IDs within an index file. In the example, the value range of the randomly generated node IDs is 0 to 9,999, and 5,600 of such node IDs have been generated in this value range. If the range is divided into 100 groups (one for each percent), 56 node IDs would be expected in each group. The data storage system, e.g., the content repository application 128, proceeds to calculate the offsets as follows. For each group, the system looks at how many actual node IDs were generated. For example, in the 1st group 49 node IDs within range were actually generated. The offset is then calculated as the difference between 56 (the expected number of node IDs) and 49 (the actual number of node IDs), which equals to 7. The process is repeated for all groups, and at the end of the process an offset value is calculated for each group. The list of offsets, which in this example includes 100 offsets, is stored in the index file as previously described. In one embodiment, the offset value that is stored in the offset is multiplied by the data size of each index entry. Those skilled in the art will recognize the range and the number of groups depicted are for illustrative purposes only and any range and number of groups may be used in calculating the offsets.

Figure 3F:
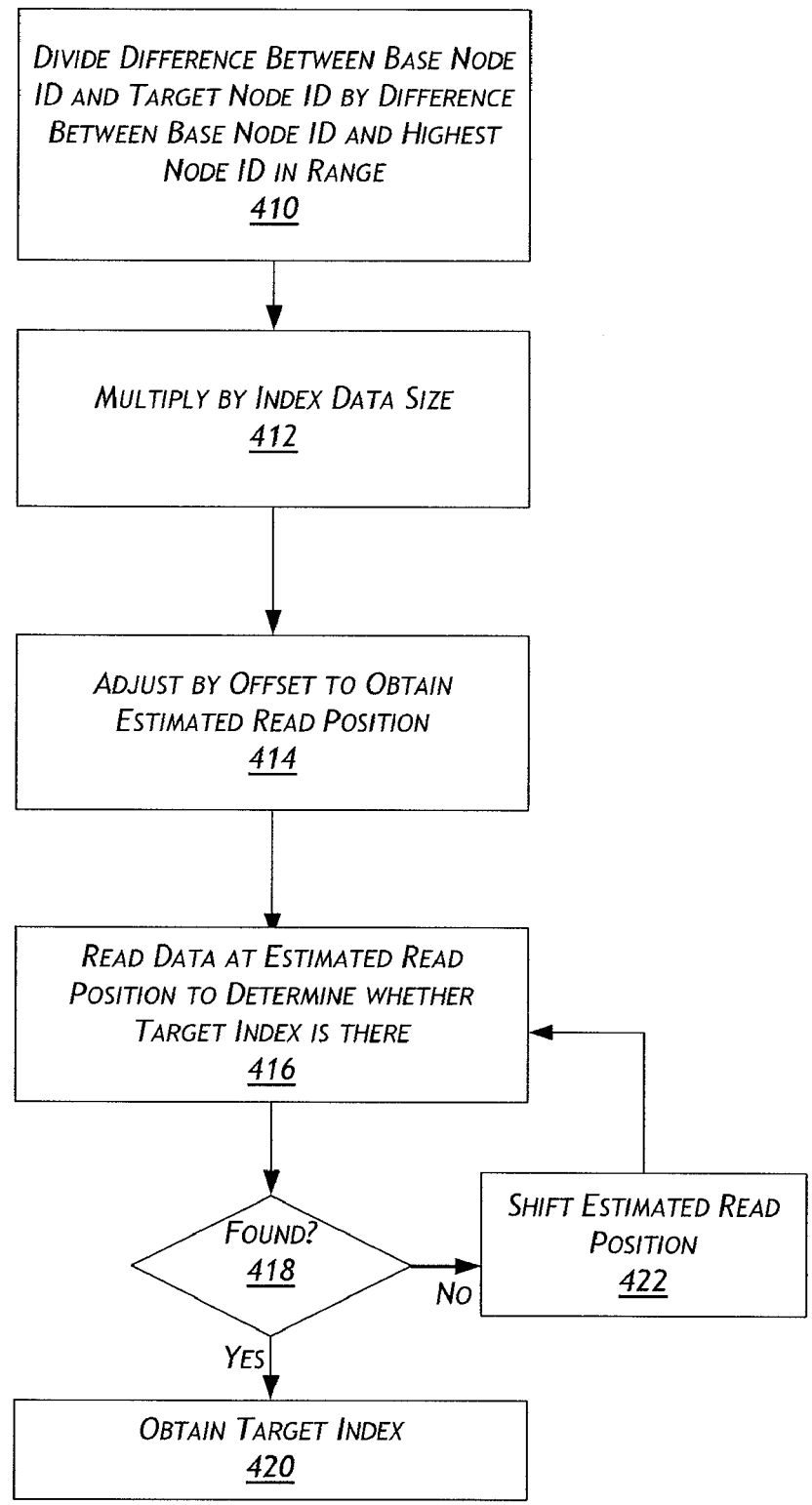
FIG. 3F is a flow diagram showing the process of locating an index entry in accordance with one embodiment.

As the index entries are sorted by node IDs, embodiments take these offsets into account and use the process shown in FIG. 3F to find a target entry with a particular a node ID within an index file. At state 410, the position of the target entry in an index file is calculated by dividing the difference between the base node ID (the lowest valued node ID within the range) and the target node ID by the difference between the base node ID and the highest node ID with the value range for the node IDs for the index file. Then at state 412, the result from state 410 is multiplied by the index data size. The result is the expected position of the target entry in the index file.

Then at state 414, the corresponding offset may then be determined by locating the group to which the target node ID belongs and looking up the corresponding offset as shown in FIG. 3E. The offset may then be used to adjust the expected position. For example, an offset may compensate for the fact that the target node ID is within a sparsely distributed group but moving the expected position where the target node ID may be found. In one embodiment, the offset can be added to or subtracted from the expected position to estimate the position of the target entry. Then at state 416, once the estimated position is calculated, the data storage system, e.g., the content repository application 128, may instruct the underlying operating system to read at that estimated location.

Because an operating system read usually provides a minimum read size, it is likely that the target entry will fall within the minimum read size window and be obtained in state 420. For example, the UNIX operation system and other common operating systems have a standard minimum read size of 4 Kb. As the index entry of the various embodiments is preferably implemented in 64 byte data size, a minimum read size of 4 Kb would encompass a large number of index entries and the target entry is likely located therein. Even if the read window misses the target entry, because the index entries are sorted by node IDs the system will be able to determine which direction to shift the next data read at state 422. It is very likely the next additional read will locate the target entry. The process repeats until the index entry is found. However, because of the calculation that is performed to obtain the estimated read position, in most cases the target index entry can accessed with a single data read. Therefore, under this process pre-calculating the read location, index entries can be quickly located without any searching. In essence, because searching is eliminated, a target index can be located in O(1) (constant) time, while binary-tree based indices for conventional databases often require O(log n) (logarithmic) time searches. This process greatly enhances the speed of all data operations that are assisted by index lookups.

Index File Update and Merge Operations

Figure 4:
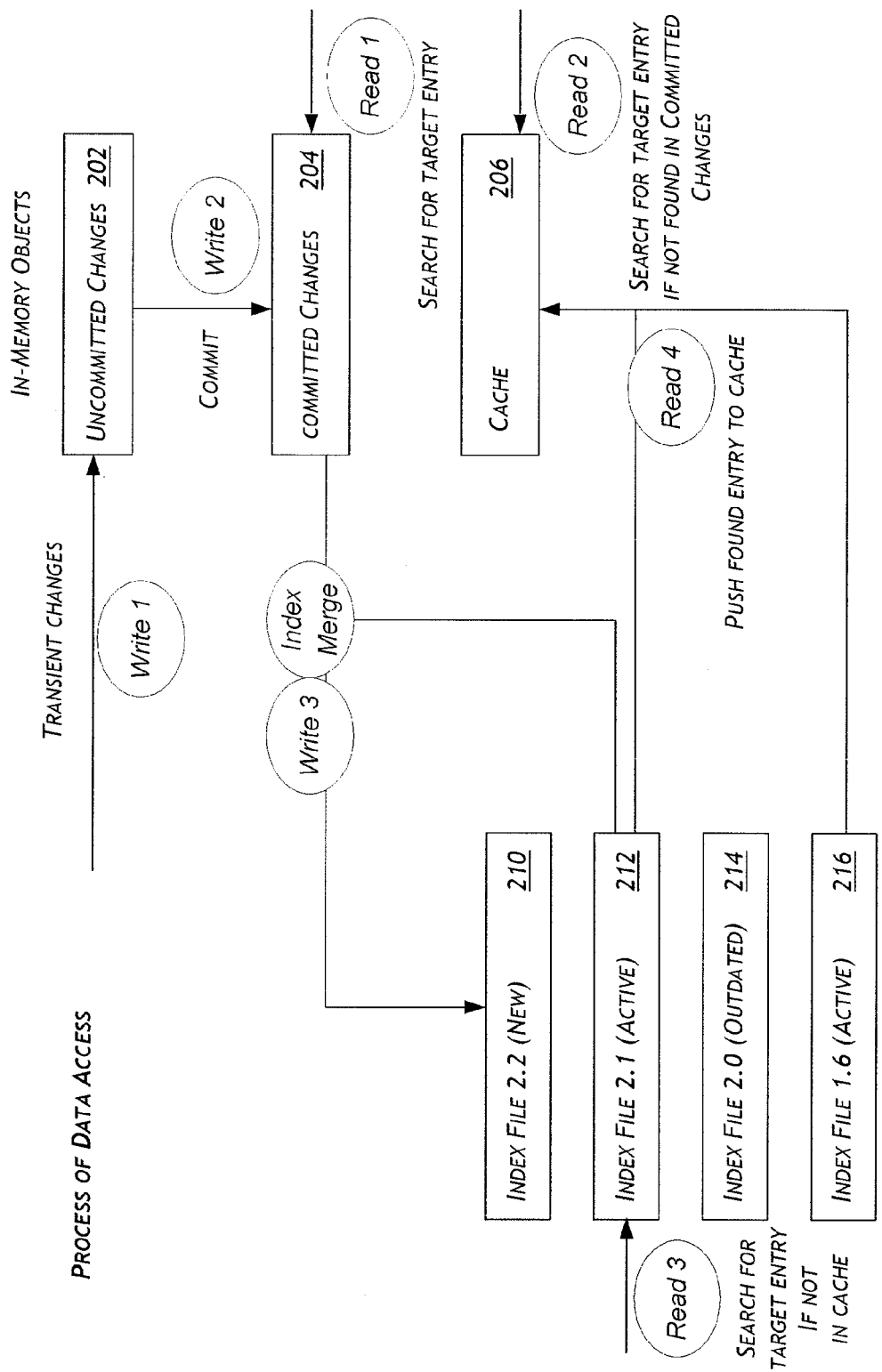
FIG. 4 is a diagram showing example data access operations with index files according to one embodiment.

FIG. 4 is a block diagram showing the process of updating data when an index is implemented. As the start of the process (as denoted by the state label "Write 1"), transient changes are received. The changes, which include new data (updates, additions, deletions) that is about to be stored into the data files, are first put in an uncommitted changes map 202. The new data includes the actual data to be appended to the data files, as well as new index entries that will reference the new data. The data stays there until it is committed or rolled back. If it is rolled back, the new data is removed and no change is made to either the index or data file. Otherwise, if the new data is committed (as denoted by the state label "Write 2"), the new data is added to a "committed changes" map 204. In an alternate embodiment, the changed data is written immediately to the data files without waiting for the commit entry, but the index changes or deletions are kept in the uncommitted index changes map until the transaction is committed. In this embodiment, a transaction rollback operation will result in a transaction rollback entry in the data file, and will cause the rolled back entries to be removed from the uncommitted index changes map.

The "committed changes" map 204 grows overtime as more new data is stored there. Once the "committed changes" map 204 reaches a configurable pre-defined threshold, a new index file is created (as denoted by the state label "Write 3"). In the example shown in FIG. 4, an index file 210 has been newly created and marked as version 2.2. The newly created index file is marked as temporary until its creation process is completed, i.e., until all committed changes have been merged with version 2.1.

In one embodiment, the process of creating a new index file involves merging together new entries from the committed changes map 204 with those from the highest version numbered index file. To ensure that the new index file is sorted by node IDs to facilitate the lookup process described in conjunction with FIGS. 3E and 3F, a merge sort algorithm is used in one embodiment. In this example, entries from the index file 212 (version 2.1, currently the highest version) are merged together with entries in the "committed changes" map 204 to form the new index file 210 (version 2.2).

As described above, new data entries are appended to the log-based data files for delete and update operations. When an incoming new index entry represents a delete or an update, during the merge process the new index entry referencing the newly appended data entry is chosen over the current entry referencing the old entry. For example, if index version 2.1 contains an index entry with a node ID of "2,345" and the committed changes map 204 contains a new index entry with the same node ID (representing an update to that node), during the merge process only the new index entry is written to the new index file version 2.2. On the other hand, if the current index entry with the node ID of "2,345" resides in a lower version active index file such as version 1.6, the new index entry is simply written into the new index file version 2.2. Although there would be two index entries with the same node ID, because the read operation described in conjunction with FIG. 3C searches for a target index entry in the highest version numbered index file first, the index entry in index file version 2.2 would be located first and used. The obsolete entry in index file 1.6 will eventually be deleted in later merge operations.

Upon the completion of the merge operation, the "committed changes" map 204 is cleared. As data from the committed changes overwrites data in the old data files, entries in some index files may become obsolete and the index files may be eventually deleted. For example, the index file 214 (version 2.0) is deleted when the data entries referenced by its index entries have been overwritten, i.e., when the index entries of the index file 214 are no longer used.

The merge process is repeated until the current highest version numbered index file grows to a size that exceeds a pre-defined threshold. If the new merged file exceeds the threshold, a new index file with a new major version is added. In that case, only the entries in the "committed changes" map are stored in the new index file. To illustrate this process, assume for example that the committed changes map 204 has a size threshold of 100 entries and the index file has a size threshold of 1,000 entries. With these thresholds, the index file 214 (version 2.0) would have 100 entries, since it is a new major version and it simply has all the entries of the current committed changes map. Each successive minor version (e.g. 2.1, 2.2, etc.) would have an additional 100 entries until at version 2.9 the index file would have 900 entries (assuming no deletion of obsolete entries of the sake of simplicity). Since merging these 900 entries with the next batch of 100 entries from the committed changes map 204 would bring the index file to its size threshold, instead of a new index file marked version 2.10, a new major version 3.0 index file would be created with the 100 entries from the committed changes map 204.

To speed up the lookup process, sometimes multiple index files are merged into a new index file. For example, the index file 216 (version 1.6) and 212 (version 2.1) can be merged into a new index file marked as version 2.2. Once the new index file is created, the two old files may be deleted. In one embodiment, a merge sort algorithm is used to combine the data from two active index files, and entries that have the same node IDs are detected and only the newest entry of those entries are retained.

Index File Read Operations

In embodiments where the index is implemented in multiple index files, the process of locating a target index entry may be performed as follows. First, the "committed changes" map 204 is checked (as denoted by the state label "Read 1"). If the target entry is not found, the cache is checked next (as denoted by the state label "Read 2"). If the target entry is also not found in the cache, a lookup is made in the active index files (as denoted by the state label "Read 3"), starting with the newest major version, in a process previously described in conjunction with FIG. 3C. If a target entry is found, it is added to the cache (as denoted by the state label "Read 4"). The newly found entry may replace an old entry in the cache if the cache is full. In one embodiment, a least recently used (LRU) policy is used to manage the replacement of entries in the cache. Those skilled in art will recognize that a wide variety of cache management policies can also be used.

In one embodiment, one or more of the uncommitted changes map 202, the committed changes map 204, and the cache 206 may be in-memory objects to boost the performance of the data storage system.

Optimization of Data Files

As data is not overwritten in the data files, the data files grow continuously even if only update operations are performed. As large data files reduce data operation performance, embodiments of the invention limit the size of the data files by periodically performing an optimization process on the data files. In brief, the process of optimization copies the most current data that is still used into new files and deletes old files that contain old or redundant data.

FIG. 5 provides an example of the optimization process. As shown, two example files, data files "1" and "2," are about to undergo the optimization process. The format of the data files has been simplified for the purpose of illustration. Each example data file is shown to as having a node ID-value pair in each entry, and the entries are arranged from left to right in the order added (the rightmost entries are the most recent ones). For example, the first entry in data file 1 has a node ID of "1" and a value of "A." It may be observed that there are multiple entries with a node ID of "1," which means that the node has been updated multiple times and there are several obsolete versions of the data for that node.

At the start of the process, starting with data file "1," existing data files are scanned by the process. The optimize process then looks in the index to determine the latest version of the data entry of node ID "1." This happens to be the entry in data file "2," position "3," which contains a value of "–," indicating that the node has been deleted. Therefore, no data entry for node ID "1" will be copied into the new data file "3."

Continuing with the process, the remaining items in data file 1 are read. In position "3" of data file "1," the process finds an entry for a different node, node ID "2." The process then again looks in the index to determine the latest version of the data entry for node ID "2," which happens to be located in position number "4" of data file "2." Because this entry indicates a value of "3" and not a delete indicator, this entry is copied (appended) to the new data file "3."

The same process repeats for the entry for node ID "3" in data file "1," the latest version of which is also copied (appended) to data file "3." Once data file "1" has been completely scanned and all current data has been copied, the file is deleted. This is because it no longer contains any current data that is not also in another data file. The same process is repeated for data file "2." At the end of the optimization process, only data file "3" remains. As can be seen, the total data file size is greatly reduced. In addition, after optimization, data is sorted from old to new. In one embodiment, older data is stored in data files that are separated from newer data. To separate old data and new data, the data entry may additionally include a "creation time" and/or a "last modified time." Because newer data tends to be accessed more frequently, after the separation data files containing newer data may be specially optimized for faster access, e.g., by moving some or all of them into cache memory.

Because the optimization process is an intensive and time-consuming process, it is advantageously scheduled for execution as a background process during times when the volume of normal data operations is low (e.g., at midnight or during the weekends). One advantage for this embodiment is that each data access is optimized by separating out the time-consuming data operations for execution at later scheduled times when normal data read and write operation volume is low.

Index and Data File Sizes

In various embodiments of a CMS implemented with the log-based data storage, the data files may be advantageously configured to hold 50-100 Gb of data content. In a preferred embodiment, the size of a data file could be between 512-1,024 Mb. The index file size is preferably set between 64-128 Mb, with the size of each index entry set at 64 byte each. As such, for approximately 50 Gb of data, approximate 3 index files with 1.0-1.5 million index entries would be needed. The data file size is set to be large in some embodiments because certain operating systems limit the number of files that may be concurrently opened.

Large Data Objects

To further optimize performance, embodiments may store larger objects outside of the data files in a separate content addressed storage system. Because embodiments employ an append-based data architecture, modifications and updates to larger data objects would result in disproportionally large data files that cannot be efficiently accessed. If the data files are stored on a hard drive, this could result in inefficient disk space usage. Therefore, in some embodiments, such large data objects are stored externally in a content addressed storage system. In such cases, instead of the objects themselves, the addresses of the data objects are stored in the data files.

Data Recovery

In one embodiment, at the startup of the data storage system, the list of data files is first read and opened. The index files, if implemented, are also opened at this time as well. The system then reads the active index file with the highest major version number, which contains the data file ID and position of the last persisted index data. The last persisted index data indicates the data file number and position of the index entry that was inserted last. The data files are then scanned from this point on so that the index is updated.

While scanning the data files, the data storage system may encounter a checksum error (or the end-of-file could be reached unexpectedly). This can occur, for example, if a power outage occurred while writing to the data file. In this case, the data files are truncated to the last valid position, and index files with a checksum error are deleted as they can be re-created from scratch. Index files can be recreated from scratch by completely scanning all data files. In some embodiments, during data recovery, random writes to the file are supported to clean or truncate uncommitted or incorrectly written data. Incorrectly written data can be detected by comparing the checksums in the file with the stored checksum. Uncommitted data may be a data entry that contains a transaction ID, but has no corresponding commit entry for that given transaction ID.

Computer Hardware Embodiment

Figure 6:
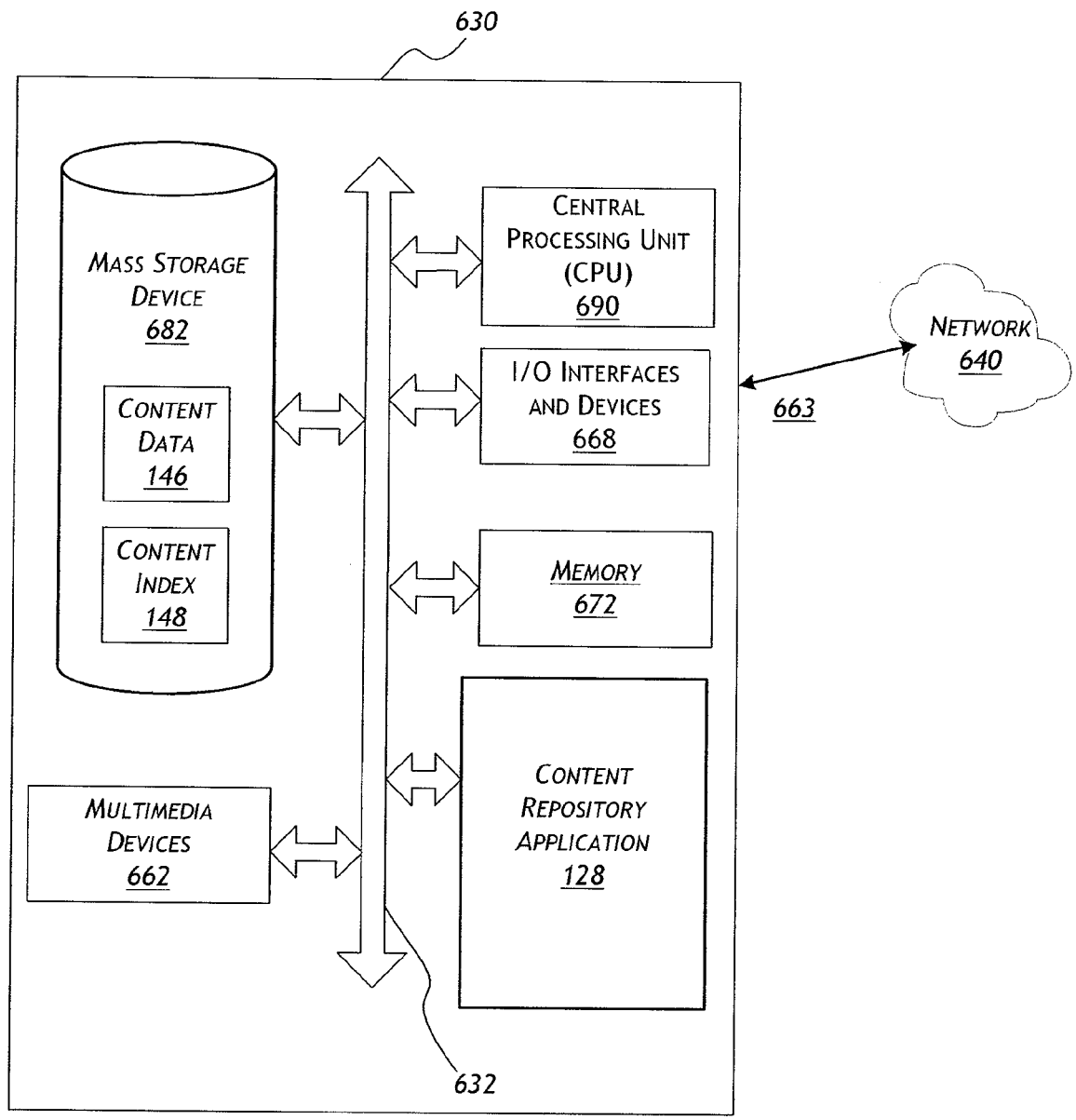
FIG. 6 is a block diagram illustrating an example hardware architecture for implementing the content management system according to one embodiment.

FIG. 6 is a block diagram illustrating how the content management system may be implemented in computer hardware in accordance with one embodiment. The depicted computing system includes, for example, a computer that is IBM, Macintosh, or Linux/Unix compatible. In one embodiment, it comprises a server, a desktop computer, a laptop computer, a personal digital assistant, a kiosk, or a mobile device, for example. In one embodiment, the sample computing system 630 includes a central processing unit ("CPU") 690, which may include one or more conventional microprocessors. The computing system 630 further includes a memory 672, such as random access memory ("RAM") for temporary storage of information and a read only memory ("ROM") for permanent storage of information, and a mass storage device 682, such as a hard drive, diskette, optical media storage device, non-volatile storage such as a flash memory drive, or other similar storage devices. For example, the content data 146 and content index 148 may be stored as standard files of an operating system executed by the computer and the files may be stored in mass storage device 682.

Typically, the components and modules of the computing system 630 are connected to the computer using a standard based bus system 632. In different embodiments, the standard based bus system 632 could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the computing system 630 may be combined into fewer components and modules or further separated into additional components and modules.

The computing system 630 is generally controlled and coordinated by operating system software, such as Windows Server, Linux Server, Windows 98, Windows NT, Windows 2000, Windows XP, Windows Vista, Unix, Linux, SunOS, Solaris, or other compatible server or desktop operating systems. In a Macintosh-based computing system, the operating system may be any available operating system, such as MAC OS X. In other embodiments, the computing system 630 may be controlled by a proprietary operating system. Conventional operating systems control and schedule computer processes for execution, perform memory management, provide file system, networking, I/O services, and provide a user interface, such as a graphical user interface ("GUI"), among other things.

The sample computing system 630 includes one or more commonly available input/output (I/O) devices and interfaces 668, such as a keyboard, mouse, touchpad, and printer. In one embodiment, the I/O devices and interfaces 668 include one or more display device, such as a monitor, that allows the visual presentation of data to a user. More particularly, a display device provides for the presentation of GUIs, application software data, and multimedia presentations, for example. The computing system 630 may also include one or more multimedia devices 662, such as speakers, video cards, graphics accelerators, and microphones, for example. In other embodiments, such as when the computing system 630 comprises a network server, for example, the computing system may not include any of the above-noted man-machine I/O devices.

In one embodiment, the I/O devices and interfaces 668 provide a communication interface to various external devices. The computing system 630 is electronically coupled to a network 640, which may comprise one or more of a LAN, WAN, or the Internet, for example, via a wired, wireless, or combination of wired and wireless, communication link 663. The network 640 facilitates communications among various computing devices and/or other electronic devices via wired or wireless communication links.

According to FIG. 6, data access requests are sent to the computing system 630 over the network 140. Similarly, results are returned over the network 140. In addition to the devices that are illustrated, the computing system 630 may communicate with other data sources or other computing devices.

In the embodiment of FIG. 2, the computing system 630 also includes a content repository application 128 that may be executed by the CPU 190. The content repository application 128 may be implemented as one or more modules, which may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Alternately, the content repository application 128 may be implemented as separate a hardware device.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. In addition, the components referred to herein may be implemented in hardware, software, firmware, or a combination thereof.

CONCLUSION

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the inventions. The invention is defined by the accompanying claims.

What is claimed is:

1. A content management data storage system, comprising:
a data storage device storing:
data in a logical data tree, the data tree comprising a plurality of nodes, wherein each node stores data associated with the node;
a plurality of data entries stored in a log-based arrangement, each entry comprising a key and a value, wherein the key comprises a randomly-generated unique node identifier that identifies a node in the logical data tree and the value comprises the data associated with the node; and
an index that facilitates lookup of the log-based stored data, the index comprising a plurality of index entries, each of which comprising the unique node identifier for one of the plurality of data entries in the log-based stored data;
wherein the index entries are sorted, through a computer processor, by the node identifiers and a target index entry with a target node identifier is directly located by:
using the order of the sorted index entries to estimate the location of the target node identifier within the value range distribution of the node identifiers in the index; and
using the estimated location to calculate an estimated read position of the target index entry within the index.

2. The system of claim 1 wherein the estimated location is calculated by dividing the difference in value between the target node identifier and the lowest valued node identifier within the value range and by the difference between the highest valued node identifier within the value range and the lowest valued node identifier.

3. The system of claim 2 wherein the estimated read location is calculated by multiplying the estimated location by the data size of the index and adjusting the result by an offset.

4. The system of claim 3 wherein the offset represents the difference between the expected distribution and the actual distribution of the node identifiers.

5. The system of claim 3 wherein the content management system instructs an operating system to read and return data at the estimated read location, wherein the returned data is of a standard minimum read size of the operating system.

6. The system of claim 1 wherein data associated with a target node is updated by:
appending to the log-based stored data a new data entry comprising:
a key comprising the unique identifier for the target node; and
a value comprising updated data for the target node; and
adding to the index a new index entry that references the new data entry.

7. The system of claim 1 wherein data associated with a target node is deleted by:
appending to the log-based stored data a new data entry comprising:
a key comprising the unique identifier for the target node; and
a value comprising a delete indicator; and
adding to the index a new index entry that references the new data entry.

8. The system of claim 7 wherein the delete indicator is a data with a length of zero.

9. The system of claim 1 wherein a plurality of nodes of the logical data tree structure are adapted to store content of a web site.

10. The system of claim 1 wherein the data storage device further stores a shared data storage configured to store large data files.

11. The system of claim 1 wherein the log-based stored data is stored in one or more standard files in a standard operating system.

12. The system of claim 1 wherein the index is stored in one or more standard files in a standard operating system.

13. The system of claim 1 wherein a plurality of nodes of the logical data tree are adapted to store data from one or more relational databases.

14. The system of claim 13 wherein a plurality of nodes is configured to store table data, wherein one of the plurality of nodes is adapted to store a row of the table data.

15. A system for providing data storage for a content management system, comprising:
   a data storage device storing a plurality of key and value pairs, wherein the key comprises a unique identifier and the value comprises stored data content, wherein the plurality of key and value pairs are stored in one or more data files, and wherein updates to the stored data content are appended to the newest of the one or more data files; and
   an index stored in a storage device that facilitates data lookup of the data content, wherein the index comprises a plurality of index entries, each of which references one of the plurality of key and value pairs.

16. The system of claim 15 wherein the index is stored in a plurality of index files.

17. The system of claim 16 wherein the storage device comprises volatile memory.

18. The system of claim 16 wherein the storage device comprises a disk.

19. The system of claim 15 wherein the index files are periodically merged to form larger index files.

20. The system of claim 15 wherein the data files are periodically optimized to move updated data content to new data files and remove old data files containing old data content.

21. The system of claim 15 wherein the data files are periodically optimized so that old data content is separated from new data content.

22. The system of claim 15 wherein the data files are stored in a standardized file format.

23. The system of claim 22 wherein the standardized file format is the tar format.

24. The system of claim 22 wherein the standardized file format is the zip format.

25. The system of claim 22 wherein the data files are compressed using a data compression format that supports blockwise compression, whereby the plurality of key and value pairs in the data storage are compressed individually.

26. A computer-implemented method for creating and operating a data storage, comprising:
   creating a log-based data storage comprising a plurality of key and value pairs, wherein the key comprises a unique identifier and the value comprises stored data content, and the log-based data storage is stored in one or more data files; and
   updating a target stored data content in one of the key and value pairs by appending a new key and value pair to the newest of the data files, wherein the updating effects:
      a deletion of the target stored data content by appending the new key and value pair, wherein the new key comprises the identifier of the target stored data content and the value comprises a delete indicator, and
      an update of the target stored data content by appending the new key and value pair, wherein the new key comprises the identifier of the target stored data content and the value comprises updated data content to replace the target stored data content.

27. The computer-implemented method of claim 26 wherein the delete indicator is a data with a length of zero.

28. The computer-implemented method of claim 26 further comprising: optimizing the stored data content by moving updated data content to new data files and remove old data files containing old data content.

29. The computer-implemented method of claim 28 where the old data files that are removed contain only old data content.

30. The computer-implemented method of claim 28 wherein the optimizing further comprises:
   for each unique key, looking up an index that comprises index entries referencing the locations of the key and value pairs to determine the most updated version of the value for the unique key;
   copying the unique key and the most updated version of the value into a new data file.

31. The computer-implemented method of claim 28 wherein the optimizing is performed at scheduled times when volume of normal data access to the data files is low.

32. A computer-implemented method for accessing a data storage, comprising:
   creating an index to facilitate access to a log-based data storage with a plurality of data entries, wherein the index comprises a plurality of index entries, one or more offset values for the plurality of index entries, and a data size entry of the index, and wherein each index entry further comprises:
      a node identifier that is randomly generated and one or more reference information items for referencing the data entry in the log-based data storage that is associated the node identifier; and
   accessing a target data entry with a target node identifier by searching in the index for a target index entry with the target node identifier and using the one or more reference information items associated with the target node identifier to locate the target data entry;
   wherein the values of the node identifiers of the index entries are within a value range between the value of a base node identifier and a highest node identifier within the index and the index entries are sorted by the values of the node identifiers.

33. The computer-implemented method of claim 32 wherein the one or more reference information items comprise a data length entry, a data file reference entry, and an absolute position entry.

34. The computer-implemented method of claim 32 wherein the accessing further comprises:
   calculating an expected location of the target index entry by dividing the difference in value between the target node identifier and the lowest node identifier within the value range by the difference in value between the highest node identifier and the lowest node identifier within the value range, and then multiplying the result by the data size entry of the index;
   adjusting the expected location by one of the one or more offset values to obtain an estimated read location of the target index entry; and
   instructing an operating system to read from the estimated read location and return data at the estimated read location, wherein the returned data is of a standard minimum read size of the operating system.

35. The computer-implemented method of claim 34 wherein the offset value used in the adjusting is selected based on the value of the target node identifier and represents the difference between the expected distribution and the actual distribution of a group of node identifiers within a smaller value range to which the target node identifier belong.

36. The computer-implemented method of claim 32 wherein the index is stored in a plurality of index files.

37. The computer-implemented method of claim 36, further comprising:
attempting to locate the target index entry in a committed changes memory map.

38. The computer-implemented method of claim 37, further comprising:
if the target index entry is not in the committed changes memory map, attempting to locate the target index entry in a cache.

39. The computer-implemented method of claim 38, further comprising:
if the target index entry is not in the cache, attempting to locate the target index entry in one or more active index files of the plurality of index files.

40. The computer-implemented method of claim 36, further comprising:
marking each of the index files with a version number based on the order of creation of the index files;
locating the target index entry by looking first in the index file with a version number indicative of a most recent time of creation.

41. The computer-implemented method of claim 36, further comprising:
writing a new data entry and an associated new index entry in a committed changes memory map;
merging the new index entry with index entries from an active file of the plurality of index files;
writing the merged new index entry and the plurality of entries from the active index file into a new index file.

* * * * *